March 8, 1927. 1,620,321
L. W. BROWNE
AUTOMATIC RELIEF VALVE
Filed Oct. 26, 1925
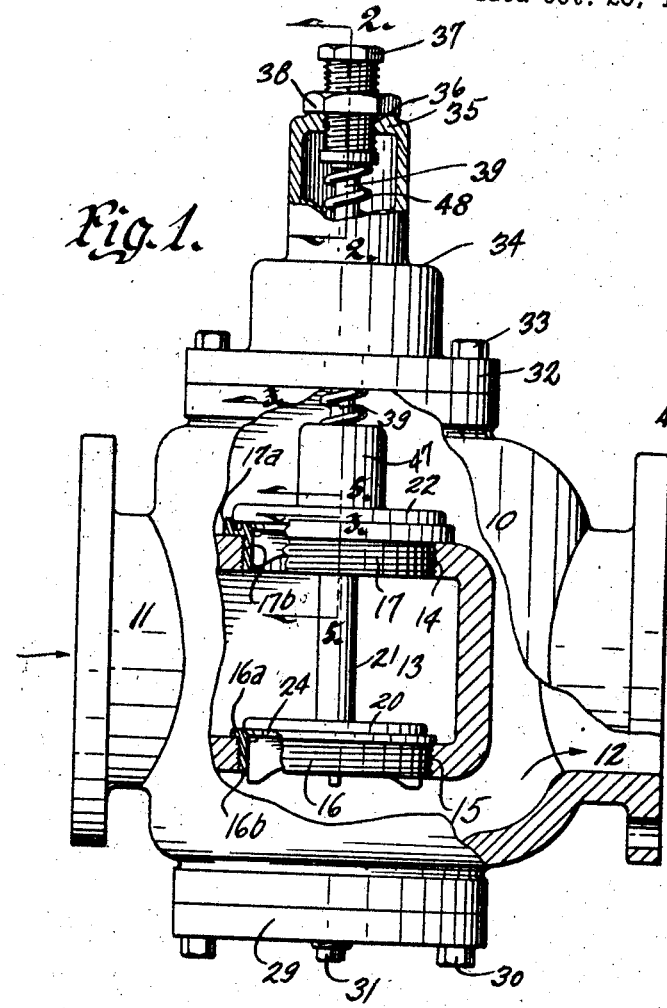
Fig.1.
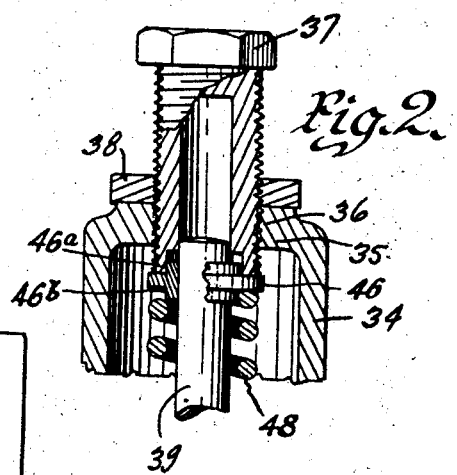
Fig.2.
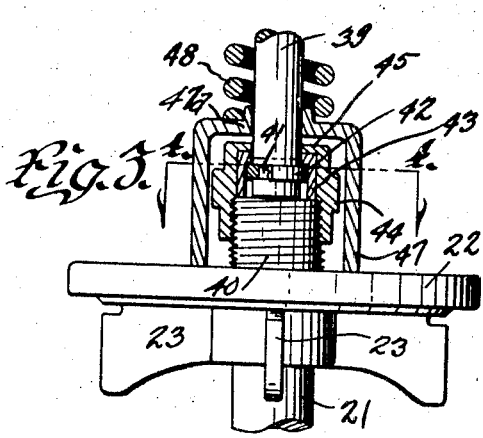
Fig.3.
Fig.4.
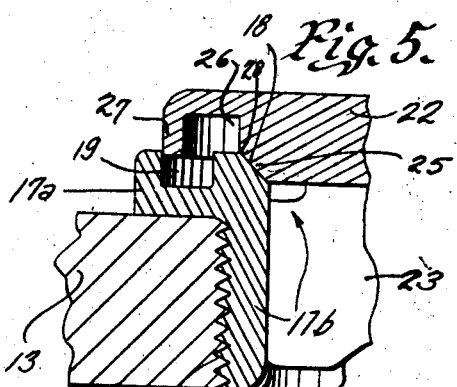
Fig.5.
Witness
Roy Rusher
Inventor
Lyle W. Browne
by Bair & Freeman Attorneys Patented Mar. 8, 1927.

1,620,321

UNITED STATES PATENT OFFICE.

LYLE W. BROWNE, OF MARSHALLTOWN, IOWA, ASSIGNOR TO THE FISHER GOVERNOR COMPANY, OF MARSHALLTOWN, IOWA.

AUTOMATIC RELIEF VALVE.

Application filed October 26, 1925. Serial No. 64,807.

The object of my invention is to provide an automatic relief valve of simple, durable and inexpensive construction.

More particularly, it is my purpose to provide a valve of the type under consideration involving certain novel features of construction, whereby the action of the valve in opening and closing is made positive and the objectionable feature of fluttering and consequent hammering is eliminated.

Another purpose is to provide an automatic relief valve of the balanced type, certain novel features of construction for connecting the valves proper with a suitable guided stem in such manner as to permit the proper seating of the valves under all operating conditions.

With these and other objects in view, my invention consists in the construction, arrangement and combination of the various parts of my automatic relief valve, whereby the objects contemplated are attained, as hereinafter more fully set forth pointed out in my claims, and illustrated in the accompanying drawings, in which:

Figure 1 is a side elevation of an automatic relief valve embodying my invention, parts being shown in section and parts being broken away.

Figure 2 is a detail, sectional view taken on the line 2—2 of Figure 1.

Figure 3 is a detail, sectional view taken on the line 3—3 of Figure 1.

Figure 4 is a detail, sectional view taken on the line 4—4 of Figure 3; and

Figure 5 is a detail, sectional view taken on the line 5—5 of Figure 1.

In the accompanying drawings, I have used the reference numeral 10 to indicate generally the casing or valve body of my improved automatic relief valve.

The casing 10 has on one side a passage or opening 11, which may be called the inlet passage and on the other side a passage or opening 12, which may be called the outlet passage.

It will be understood that from the passage 11 a cage or inner casing 13 extends into the interior of the valve body 10 in communication with the passage 11. The inner casing 13 has in its top and bottom walls (considering the valve body to be in its upright normal position, as shown in Figure 1), openings 14 and 15.

In the opening 15 is detachably mounted the valve seat, which for convenience I call the bottom seat ring 16, which as shown, comprises an annular seat $16^a$ with a downwardly projected flange $16^b$ externally screw-threaded to fit the screw-threads of the opening 15.

Similarly mounted in the opening 14 is the upper valve seat, which for convenience I call the top seat ring 17, comprising the annular seat $17^a$ and the screw-threaded flange $17^b$.

It will be understood that the interior diameters of the valve seat rings 16 and 17 differ slightly, that of the ring 17 being a little larger than that of the ring 16, so that the valves may not be balanced.

The top seat ring 17 has adjacent to its interior at its upper edge, the beveled seat portion 18, as shown in Figures 1 and 5.

In the top portion of the ring seat proper $17^a$ of the top seat ring 17, spaced outwardly from the beveled portion 18 and concentric therewith, is an annular groove 19.

Arranged to coact with the bottom seat ring 16 is a valve 20 from which the stem 21 projects upwardly as shown in Figure 1.

Arranged to coact with the top seat ring 17 is a valve 22 to which the stem 21 is fixed. The valves 20 and 22 are provided with downwardly, projecting, radially arranged guide wings 23.

The valve 20 has on its lower surface the downwardly projecting beveled portion 24, as shown in Figure 1, arranged to coact with the correspondingly beveled portion of the bottom seat ring 16.

The valve 22 has on its underside, the downwardly projecting beveled portion 25 to coact with the beveled face 18 of the top seat ring 17.

The valve 22 has in its under surface an annular groove 26 just outside the beveled portion 18. The inner, vertical wall of the groove 26 forms a shoulder at the outer edge of the beveled portion 25 as shown in Figure 5.

That portion of the valve 22 shown at 27 in Figure 5, which forms the outer wall of the groove 26 projects downwardly just a little below the level of the line of juncture, indicated at 28 between the upper edge of the beveled portion 25 and the inner wall of the groove 26.

The total diameter of the valve 22 is such that when the beveled portion 25 is seated on the beveled face 18 of the ring 17, the lower edge of the wall 27 will project slightly into the groove 19, snugly fitting adjacent to the outer wall thereof, so that the grooves 19 and 26 then form a single annular chamber, as illustrated in Figure 5.

The purpose of this structure will be hereinafter more fully referred to.

The lower part of the valve body or casing 10 has an opening, which is ordinarily closed by the blind flange or cover plate 29, which is secured to the body 10 by means of cap screws 30 or the like.

The coacting blind flange or cover plate 29 has a central opening, normally closed by the screw plug 31 and designed to form a vent for clean-out purposes and the like.

The upper part of the body 10 is provided with an opening normally closed by the top cover plate 32 held in place on the valve body by cap screws 33.

The top plate 32 has the form of an annular ring and extending upwardly from the inner edge of the ring is the spring case 34 having its upper end 35 closed except for the opening 36 therein.

Screwed into the opening 36 is a hollow adjusting screw 37 on which above the spring case 34 is the lock nut 38.

Arranged with its end slidably received in the hollow adjusting screw 37 is the valve stem plunger 39, the connection of which with the valve 22 will now be described.

Referring to Figure 3, it will be observed that the valve 22 has an upwardly projecting, externally, screw-threaded valve stem member 40.

I have tested a great many different means for connecting the stem plunger 39 with the valve 22 and have found the structure which will now be described to be the most satisfactory for allowing slight rocking movement of the valves 22 and 20 with relation to the valve stem plunger 39.

At the lower end of the valve stem plunger 39, the said plunger is provided with an annular groove 41. A split ring or collar 42, made in two halves, is seated in the groove 41 and projects substantially therefrom, thus having in effect the structure of an annular rib or flange formed on the valve stem plunger 39.

Mounted on the valve stem plunger 39 and receiving the collar 42 is a washer 43 having the form of a downwardly opening cup, slidably received on the member 39 and receiving the collar 42 and resting on the upper end of the stem 40.

What may be called a valve stem nut 44 is screwed onto the stem 40, projecting upwardly therefrom and having at its upper end an annular interior flange 45, overlying the washer 43 and snugly holding the parts together, as illustrated in Figure 3.

The parts are so arranged as to allow slight play of the valve 22 with relation to the stem plunger 39, so as to permit the snug seating of the valve under all service conditions.

A top spring seat 46 rests against and has a sleeve portion 46$^a$ extending into the lower end of the hollow screw 37 and another sleeve portion 46$^b$ extends into the end of the coil spring 48. A bottom spring seat 47 has the form of a downwardly opening cylindrical casing, open at its lower end and provided at its upper end with the spring seat top member 47$^a$, through which the stem plunger 39 projects.

The spring seat proper 47 does not fit the stem plunger 39 snugly enough to prevent the play of the parts hereinbefore mentioned.

On the stem plunger 39 between the spring seats is a coil spring 48.

In the practical operation of my improved automatic relief valve, assuming that the passage 11 is in communication with a gas or fluid under pressure, and that it is desired to relieve that pressure whenever it reaches a certain predetermined maximum, it will be obvious that the lock nut 38 may be screwed upwardly on the nut 37, and the nut 37 screwed upwardly or downwardly for regulating the tension of the spring 48.

This adjustment may be so regulated that at any desired maximum pressure through the passage 11, the valves will be raised for permitting an escape of fluid under pressure until the pressure is reduced to the point where it is not subject to overcome the tension of the spring 48. As a matter of fact with a structure of this kind, great pressure can be accurately and easily controlled.

In a device of this kind with which it is desired to automatically maintain pressure in a receiver of some kind at a predetermined maximum, difficulty has heretofore been encountered on account of the fact that when the pressure on both sides of the valve is almost balanced, there has been a tendency of the valves to flutter and hammer.

In order therefore to prevent a fluttering of the valves and to insure a positive opening and closing of the valves, I have provided the compartment 19 as hereinbefore described.

Assuming that the pressure in the intake passage 11 has been built up to the point where it will barely overcome the tension of the spring 48, it will be seen that that pressure will raise the valve 22, which will carry with it the valve 20. The instant the valve 22 raises off the beveled seat 18, the area subject to the pressure in the intake passage 11 and in the casing portions 13 is increased and pressure can act on the valve 22 to the outer wall of the groove 26.

It will thus be seen that immediately the valve 22 will be subject to pressure over a considerably greater area than that to which it was subjected when tightly seated.

The increasing of the air subject to pressure on the intake side causes the valve 22 to open quickly and positively and avoids the tendency to flutter and hammer which otherwise sometimes exists.

The valves then allow the passage of fluid until the tension of the spring 48 is sufficient to overcome the pressure on the intake side of the valve, whereupon the spring 48 actuates the valves toward closing position.

I consider this structure just mentioned and the resulting function to be important features of my invention.

The structure for connecting the valves with the stem plunger 39, I also consider to be unusually effective and an important feature of my invention.

It will be obvious that this device could be used with a suction means connected with the discharge side of the valve body.

Changes may be made in the details of the structure and arrangement of the parts of this device, and it is my purpose to cover by the patent to be issued upon this application, any such changes in structure or use of equivalents, which may be reasonably included within the scope of the claims of such patent.

I claim as my invention:

1. In an automatic relief valve, a hollow valve body having intake and outlet openings, an interior casing communicating with the intake opening having opposite passages provided with valve seats, valves for said seats having a stem connecting them, said valves being of slightly different areas exposed on the intake side of the device, one of said seats having a beveled portion and an annular groove outside said portion, the valve for coacting with said last named seat having a portion to coact with the beveled portion of the seat and an annular groove outside of its beveled portion adapted when the beveled portions of the seat and valve engage to form with the first groove a compartment with the outer wall of the second groove coacting with the outer wall of the first groove for closing said compartment, a valve stem plunger connected to said valve, a spring for imparting yielding, closing pressure to the valve, said spring encircling said plunger whereby the plunger forms a guide for the spring, a hollow screw receiving the end of said plunger and a washer between the screw and the spring, said washer having a sleeve portion projecting into the screw.

2. In a valve structure of the class described, a hollow valve body having intake and outlet openings and having an interior casing communicating with one of said openings and having opposite valve openings provided with valve seats, said valve openings being of slightly different areas, valves for cooperating with said seats, a stem connecting said valves, a valve stem plunger, means for connecting said valve stem plunger with one of said valves, comprising a plural-part collar, said plunger having a groove in which said collar is seated, a stem on the valve connected with said plunger, a shouldered sleeve mounted on said plunger and receiving said collar, a valve stem nut mounted on said stem and around said plunger and receiving said collar and shouldered sleeve for permittting slight play between the plunger and the stem, means for imposing yielding pressure for impelling said valves in closing direction, said means being adjustable for regulating the tension of said yielding device, whereby the relief valve may be set for being actuated at any desired maximum pressure, a cup covering the connecting means of the valve stem plunger to one of the valves, the means for imposing yielding pressure on the valve, coacting with said cup and said cup coacting with said valve whereby the yielding means does not impose its pressure on the connecting means.

3. A valve structure comprising a casing, a valve therein, a connecting means comprising a stem on said valve, a valve stem plunger having a groove, a plural part ring in said groove a shouldered sleeve covering said ring, the shoulder of the sleeve being adjacent the ring and the end of the sleeve engaging the valve stem, a retainer covering said sleeve and adapted to engage the valve stem and maintain the sleeve in engagement therewith whereby slight movement of the valve stem plunger relative to the valve stem is accomplished, a cup covering but spaced from said connecting means, a spring for closing said valve, said spring coacting with said cap.

4. A valve structure comprising a casing, a valve therein, a connecting means comprising a stem on said valve, a valve stem plunger having a groove, a plural part ring in said groove a shouldered sleeve covering said ring, the shoulder of the sleeve being adjacent the ring and the end of the sleeve engaging the valve stem, a retainer covering said sleeve and adapted to engage the valve stem and maintain the sleeve in engagement therewith whereby slight movement of the valve stem plunger relative to the valve stem is accomplished, a cup covering but spaced from said connecting means, a spring for closing said valve, said spring coacting with said cap, a hollow screw in said casing, a washer against the end thereoef and having a portion projecting therein, said washer engaging said spring whereby adjustment of the screw will vary the tension of the spring on the valve.

LYLE W. BROWNE.